Feb. 11, 1958 P. F. NOVAK 2,823,379
AERIAL TENSIONING AND AUTOMATIC DISCONNECT UNIT
Filed June 15, 1955
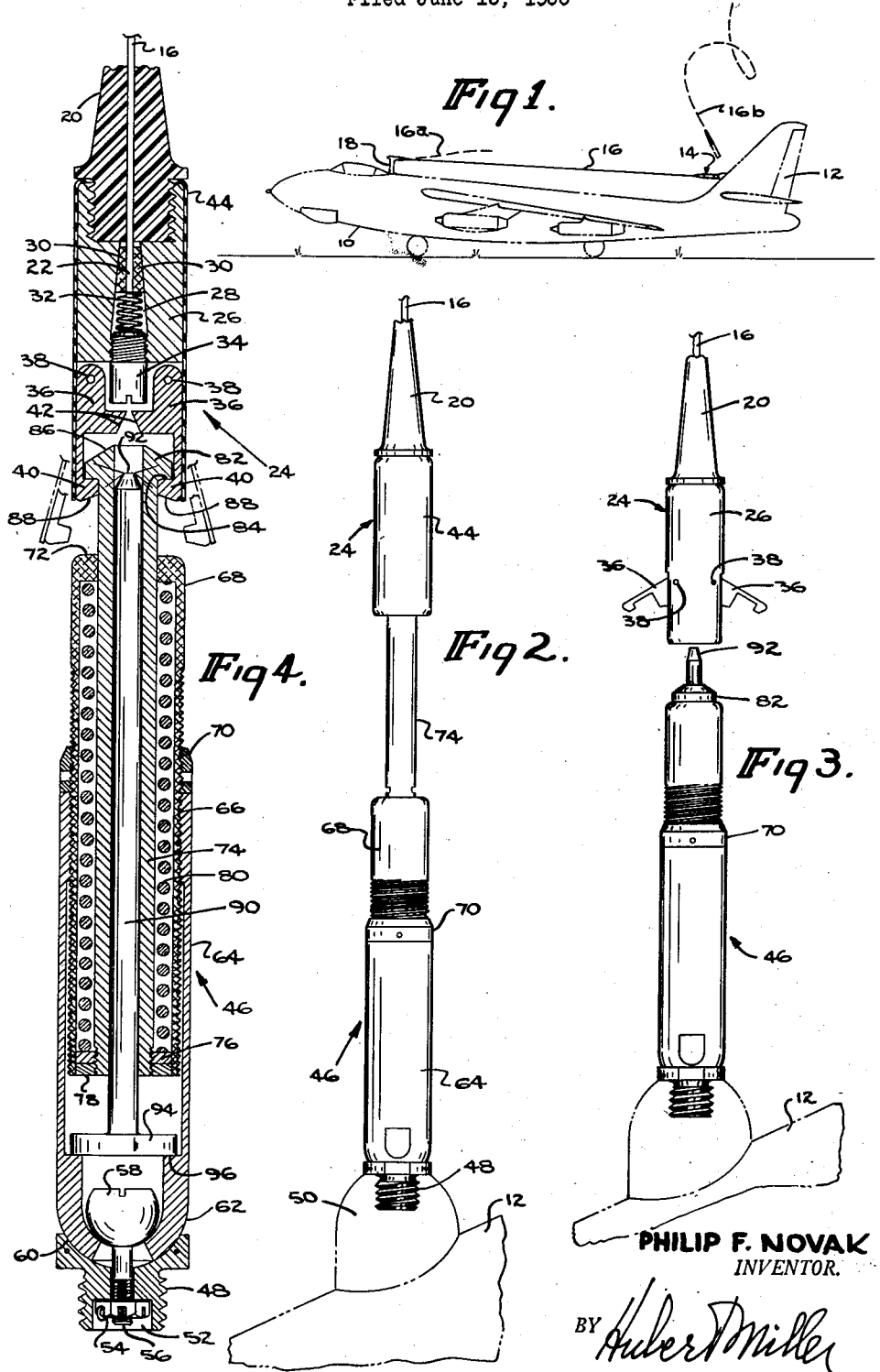
PHILIP F. NOVAK
INVENTOR.
BY United States Patent Office 2,823,379
Patented Feb. 11, 1958

2,823,379

AERIAL TENSIONING AND AUTOMATIC DISCONNECT UNIT

Philip F. Novak, Wichita, Kans., assignor to Boeing Airplane Company, Wichita, Kans., a corporation of Delaware Application June 15, 1955, Serial No. 515,578

10 Claims. (Cl. 343—707)

This invention relates in general to fastening or connecting devices and pertains more particularly to an automatic antenna release unit for use on aircraft.

Where an antenna is installed under tension between two longitudinally spaced fore and aft portions of an airplane, any accidental breakage of the aerial wire in flight will leave two flexible sections still attached to the plane. It is with the section remaining attached to the aft portion of the plane that serious danger can result, for this section is usually attached to a part of the tail assembly and the ensuing whipping about of the aerial section provides an immediate threat to the tail surfaces and controls. The ruptured end of the forward aerial section, on the other hand, creates on serious problem, because of its remoteness from vulnerable locations and due to the fact that there is little shifting from its operative or connected position.

Owing to the seriousness of the damage that can result, the need for a reliable disconnect device becomes manifest. To this end, an important object of the instant invention is to provide a fastening unit that will release the mooring of the aerial's aft end so that it will be immediately blown clear of the highly vulnerable tail assembly and its associated controls.

Another object of the invention is to achieve the release mentioned above in a facile, automatic fashion with apparatus which is lightweight, simple and exceedingly reliable. With regard to the reliability attribute, it might be explained that the automatic release may not be necessary until after a large number of flights have taken place, or in some instances it may never have to function. Nonetheless, it is essential that when the apparatus is called upon to perform that it do so, and this safeguarding operation is assured with the contemplated structure of the invention. Also, it may be pointed out that the high degree of reliability is retained, even with very infrequent or no inspections of the fastening mechanism.

A further feature of the invention resides in the fact that the automatic release or disconnect mechanism is so constructed that the aerial is always maintained under a preferred tension until breakage should occur. In this regard, it is to be noted that provision is made for spring loading the aft end of the aerial so that the aerial can easily withstand stress changes in flight.

Still further, it is an aim of the invention to utilize a single spring in the disconnect mechanism, such spring fulfilling the dual role of maintaining the aerial under tension and effecting the desired release at the needed moment. Also, by so constructing the device in the proposed manner, it will be appreciated that the anchoring means employed at the fore end of the aerial may be of very simple design.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

Figure 1 is a side elevational view of an airplane equipped with my disconnect unit, the aerial and disconnect unit before breakage of the aerial being shown in solid lines and after breakage in dotted outline;

Figure 2 is a view of the unit before release;

Figure 3 is a similar view just after release, and

Figure 4 is a longitudinal sectional view through the center of the unit in its unreleased position, but illustrating in phantom outline the position of certain parts pictured in Figure 3.

Referring in detail to the drawing a typical antenna installation is presented in Figure 1 where an airplane 10 is shown having a tail assembly 12 to which the disconnect unit designated generally by the numeral 14 is anchored. The rear end of an aerial 16 is gripped by the unit 14 and the forward end of the aerial is fixedly mounted to a short mast 18. Since the invention is not concerned with the manner in which the aerial is secured to the mast and since when breakage of the aerial has occurred in the past little or no trouble has developed with the forward wire section, it only need be said in passing that the forward mooring is effected without the incorporation thereinto of any release feature. To illustrate the principles of the invention, it will now be assumed that the aerial breaks, leaving a forward section 16a still attached to the mast 18 and a rear or aft section 16b that is exceedingly likely to wrap itself around the tail surfaces or foul up the controls. As shown in phantom outline, the rear section has been released by means of my disconnect unit, a portion of which is jettisoned along with the section 16b, all in a manner hereinafter explained more fully.

Focusing attention on Figure 4, it will be seen that the aerial or antenna wire 16 has circumscribed thereabout a plastic insulation sleeve 20, the wire having an exposed or bared end 22 which is to be gripped by the unit 14. Accordingly, the unit 14 is manufactured in two parts, the first part or assembly 24 of which comprises a metallic body 26 through which extends a tapered bore 28, the bore accommodating three complemental gripping jaws or fingers 30 which bear directly against the wire end 22. Aiding in the production of the gripping action is a coil spring 32 pressing against the larger ends of the gripping fingers 30, compelled to do so by reason of a plug 34 threadedly received in the bore 28. In this way, initial pressure of small magnitude is applied to the fingers or jaws 30 and when tension is applied to the aerial wire 16 the jaws are urged by virtue of their tapered surfaces tightly against the wire end 22.

The cylindrical body 26 is slotted or bifurcated adjacent its other end so as to pivotally accommodate a pair of dog elements 36, there being a pin 38 passing through the furcations and each dog element 36. The distal ends of the dog elements are shaped to provide inwardly directed detents 40, the office of which will presently be dealt with in detail, and intermedially the ends of the elements cam faces 42 are provided, the function of which will also be made manifest shortly. Encircling the entire chuck assembly is an elastic plastic or rubber sleeve 44 which supplies a rather gentle inward pressure against the dog elements 36, assisting in the achievement of a latching condition of the detents 40. Although it will be made clearer as the description progresses, it is this chuck assembly that is jettisoned into the slip stream with the ruptured section 16b of the aerial 16, Passing now to the second assembly 46 of the unit 14, it will be appreciated that this part 46 is to be connected directly to the tail assembly 12 by means of a plug fitting 48 threadedly received by a fitting 50 fixed to the tail assembly. The plug fitting 48 is counterbored at 52 for the accommodation of a nut member 54 threaded onto the end of a stud 56 having integral therewith a ball end 58.

The plug fitting 48 is formed with a concavity or socket 60 so that it will cooperate with the ball end 58 to provide a universal swivel joint with the parti-spherical end 62 of a cylindrical shell 64. The other end 66 of the shell 64 is internally threaded for the reception of an externally threaded cylindrical housing 68, there being a nut member 70 for securing the shell and housing in a preferred degree of telescoping engagement. As will soon be understood, the degree of telescopic reception of the housing 68 within the shell 64 can govern the amount of tensile force applied to the aerial 16, thereby permitting an adjustment of the tension to an optimum value.

The housing 68 has an inturned flange 72 at its end nearest the assembly 24, this flange forming an opening just large enough for the sliding movement of a sleeve 74 therewith. Terminally attached to one end of the sleeve is a circular nut 76, the outer diameter of which is of a size substantially equal to the inner diameter of the cylindrical housing 68. A similarly configured lock nut 78 provides insurance against accidental dislodgement of the nut 76 from the sleeve 74. By reason of the nuts 76, 78 and the flange 72 a coil spring 80 is held captive within the housing 68, the spring 80 compressing more and more as the sleeve 74 moves upwardly in Figure 4. As shown, the sleeve 74 has been moved somewhat upwardly, and hence the spring 80 is under compression in this view, such compression being instrumental in placing the aerial 16 under tension, presently to be made evident.

The other end of the sleeve is in the form of an enlarged head 82 having a shoulder 84 engageable by the detents 40. Facile engagement is accomplished by chamfering or beveling the head 82 at 86. By so configuring the head, it can bear against sloping faces 88 on the detents to urge the detents apart when entering the assembly 24, the elastic sleeve 44 readily yielding to permit such entry and serving to bias the dog elements into the latching relationship depicted, once the shoulder 84 has passed the detents 40.

With the sleeve 74 extended as illustrated in Figure 4 (thus placing the relatively high constant spring 80 under compression), the tendency of the sleeve 74 to return to a retracted position (by reason of the spring action) exerts a pull on the dog elements 36 and hence on the aerial wire 16 vias the body 26 and its encased fingers 30. In this way, the aerial 16 is maintained under tension, which tension can be altered to any desired extent by threadedly moving the shell 64 and the housing 68 relative to each other.

To effect disengagement of the sleeve head 82 from the detents 40 when the aerial 16 breaks, a probe element 90 is slidably carried within the sleeve 74 having a tapered end 92 and a flanged end 94. The flanged end 94 is of sufficient dimensions so that it will bear against a shoulder 96 integral with the shell 64. The tapered end 92, however, is disposed in alignment with the cam faces 42 formed on the dog elements 36. With the sleeve 74 in its projected position as pictured in Figure 4, the probe 90 is free literally to float, the flanged end 94 thereof being constrained or limited in travel only by the distance between the shoulder 96 and the inner end of the housing 68.

Once the aerial 16 breaks, though, the assembly 24 is pulled toward the assembly 46, since the spring 80 reacts against the nuts 76, 78 threadedly secured to the sleeve 74 so as to cause the sleeve to move rapidly inward. When this happens, the tapered end 92 of the probe projects beyond the sleeve head 82 and the continued retraction of the sleeve 74 brings the cam faces 42 of the dog elements against the tapered end 92 which of course cannot move beneath the elevation illustrated in Figure 4 because of the obstruction afforded by the shoulder 96. Consequently, the dog elements 36 are forcibly spread apart, easily overcoming the restraining or biasing action exercised by the elastic sleeve 44. This divergent condition of the dog elements is shown in phantom outline in Figure 4. Also, the divergent condition may be seen in Figure 3, somewhat exaggerated owing to the removal of the elastic sleeve 44 from this view so that the otherwise concealed dog elements 36 can be made visible. Figure 3 is of major benefit in showing the two assemblies 24 and 46 in their detached or separated condition, and from the dotted showing of the aerial section 16b in Figure 1 it can be discerned that the assembly 24 is cast into the slip stream with this separated aerial section 16b. Further, Figure 3 is helpful in showing the position of the sleeve head 82 when the sleeve is fully retracted, the head 82 under such circumstances coming against the housing 68 and simultaneously causing the probe end 92 to project therebeyond, which relative extension is responsible for the striking and spreading apart of the dog elements 36.

From the foregoing, it will be recognized that the invention has provided an antenna coupling that will both tension the aerial wire and release the dangerous portion thereof upon breakage of the wire.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In an aerial fastening device for aircraft, first separable means for attachment to one end of an aerial wire including a pair of pivotal dog elements, second separable means for attachment to a portion of an aircraft including a shell, a housing extending into said shell, a sleeve slidable within said housing provided with an enlarged end engageable by said dog elements, spring means urging said sleeve in a direction to move said enlarged end toward said housing, a probe member one end of which projects beyond said enlarged end when said sleeve is retracted, and cam means on said dog elements engageable by said probe member when said sleeve is retracted, whereby said probe member is instrumental in disengaging said dog elements from the enlarged sleeve end to separate said first and second means.

2. The structure described in claim 1 in which said shell and housing are threadedly connected to permit relative longitudinal movement and adjustment of tension applied to the aerial wire.

3. The structure described in claim 2 including means for locking said shell and housing in a preferred adjusted relationship.

4. In an aerial fastening device for aircraft, first separable means for attachment to one end of an aerial wire including a body having a tapered bore, a plurality of tapered jaw elements disposed in said bore for gripping the end of the aerial wire, said body being bifurcated, a pair of dog elements pivotally mounted between the furcations of said body, said dog elements having a pair of inwardly directed detents, a second separable means for attachment to a portion of an aircraft including a cylindrical shell, a cylindrical housing threadedly received by said shell, a sleeve slidably received by said housing having a shouldered head disposed at its projecting end, said detents being engageable with said head, a coil spring circumjacent said sleeve urging said sleeve in a direction to move said head toward said housing, and means relatively projectable against portions of said dog elements to separate same from said shouldered head when said coil spring is permitted to retract said sleeve.

5. The structure described in claim 4 in which said dog elements are provided with tapered cam faces and said relatively projectable means constitutes a slidable probe member provided with a tapered end engageable against said cam faces.

6. The structure described in claim 5 in which an elastic sleeve is circumposed about said bifurcated body and said dog elements, thereby biasing the detents of said dog elements into engagement with said shouldered head.

7. The structure described in claim 6 in which the surfaces of said detents remote from the surfaces thereof engageable with said head are tapered and said head is beveled to facilitate entry of said head between said biased detents.

8. In an aircraft antenna system, an aerial wire having one end affixed to a forward portion of the aircraft and its other end detachably anchored to the aircraft's tail assembly, the system including an aerial tensioning and automatic disconnect unit comprising first separable means for gripping said other aerial end including a pair of pivotal dog elements, second separable means including a shell having swivel means at one end for connection to the craft's tail assembly, a housing received in the other end, a sleeve slidable within said housing having a projecting head provided with a shoulder engageable by said dog elements, spring means for retracting said sleeve, and probe means extending through said sleeve for disengaging said dog elements from said head upon retraction of said sleeve, whereby said spring means is instrumental in maintaining said aerial wire under tension until breakage of said wire and upon breakage exercising retractive control of said sleeve to cause said probe means to strike said dog elements thereby disengaging same from said head to separate said first and second means.

9. The structure described in claim 8 in which said housing is threadedly received in said shell to afford adjustment of the degree of tension imposed on the aerial wire.

10. A tensioning and automatic release unit for a wire type antenna comprising: an elongated shell having one end attachable to fixed antenna supporting structure; an elongated sleeve projecting from and reciprocable through the other end of said shell and having a shouldered head at its projecting end which limits penetration of the sleeve into the shell; spring means urging the sleeve into said shell and limiting its outward movement with relation thereto; a body having one end attachable to an end of the antenna to be tensioned; latch means carried by the other end of said body releasably securing it to the shouldered head of said sleeve; and an elongated rigid probe positioned in the bore of said sleeve and within said shell and of a length to project outward through the shouldered head of said sleeve when the sleeve approaches a position of maximum permitted penetration in the shell, said probe serving to contact and release said latch means and permit separation of the body from the sleeve head when the sleeve is moved by said spring means into a position approaching maximum permitted penetration into said shell, the tensioning force for the antenna normally being supplied by said spring means.

References Cited in the file of this patent

UNITED STATES PATENTS 2,434,755    Boyd ---------------- Jan. 20, 1948